US009065861B2

(12) United States Patent
Singer

(10) Patent No.: US 9,065,861 B2
(45) Date of Patent: Jun. 23, 2015

(54) METHOD OF INTERACTING WITH SOCIAL MEDIA POST USING MOBILE ELECTRONIC DEVICE

(71) Applicant: Brandon M. Singer, Wexford, PA (US)

(72) Inventor: Brandon M. Singer, Wexford, PA (US)

( * ) Notice: Subject to any disclaimer, the term of this patent is extended or adjusted under 35 U.S.C. 154(b) by 297 days.

(21) Appl. No.: 13/888,491

(22) Filed: May 7, 2013

(65) Prior Publication Data

US 2014/0337758 A1 Nov. 13, 2014

(51) Int. Cl.
*H04L 29/08* (2006.01)

(52) U.S. Cl.
CPC ...................... *H04L 67/22* (2013.01)

(58) Field of Classification Search
CPC .......... G06F 3/04842; G06F 17/30268; H04L 51/32; G06Q 50/01
See application file for complete search history.

(56) References Cited

U.S. PATENT DOCUMENTS

| | | | |
|---|---|---|---|
| 6,700,612 B1 * | 3/2004 | Anderson et al. | 348/333.11 |
| 7,653,878 B1 * | 1/2010 | Russell | 715/748 |
| 8,732,605 B1 * | 5/2014 | Falaki | 715/780 |
| 2005/0287506 A1 * | 12/2005 | Bozzone et al. | 434/323 |
| 2009/0088204 A1 | 4/2009 | Culbert et al. | |
| 2010/0167646 A1 | 7/2010 | Alameh et al. | |
| 2011/0165913 A1 * | 7/2011 | Lee et al. | 455/566 |
| 2011/0302153 A1 * | 12/2011 | Meretakis et al. | 707/722 |
| 2012/0072835 A1 * | 3/2012 | Gross et al. | 715/243 |
| 2012/0086629 A1 | 4/2012 | Thoern | |
| 2012/0222061 A1 | 8/2012 | Anthru et al. | |
| 2012/0250071 A1 | 10/2012 | Miller et al. | |
| 2013/0069768 A1 | 3/2013 | Madhyastha et al. | |
| 2013/0151944 A1 * | 6/2013 | Lin | 715/234 |
| 2013/0174100 A1 * | 7/2013 | Seymour et al. | 715/863 |
| 2014/0056433 A1 * | 2/2014 | Emerson, III | 381/56 |
| 2014/0157151 A1 * | 6/2014 | Westmoreland | 715/753 |
| 2014/0317184 A1 * | 10/2014 | Weaver et al. | 709/204 |

\* cited by examiner

*Primary Examiner* — Rashawn Tillery
(74) *Attorney, Agent, or Firm* — Fox Rothschild LLP

(57) ABSTRACT

A mobile electronic device presents a social network user interface to the device's user. The social network user interface displays posts from other network members who are connected to the device's user in the social network. A social networking application highlights one of the posts on the display. If the device is shaken while the post is highlighted, the application will cause an expression of the first user's positive reaction to the highlighted post to be displayed via the social network so that the first user's positive reaction can be viewed by at least the member who provided the selected post to the social network.

20 Claims, 4 Drawing Sheets

METHOD OF INTERACTING WITH SOCIAL MEDIA POST USING MOBILE ELECTRONIC DEVICE

BACKGROUND

Social networking applications such as Facebook, Instagram, Pinterest, Twitter or LinkedIn have become ubiquitous. As the number of social media applications has grown, so has competition between the sites for users' attention. Social media site operators seek unique features to engage, attract and increase their membership.

In addition, as mobile electronic device usage has increased, so has the amount of time that users spend interacting with social media applications on such devices. However, because of the small size of a portable electronic device, social networking application providers are constrained by the number of features that they can provide to users. As they add more features, the user interface may become cluttered, and/or the content and or features may be too small for the user to easily see.

This document describes methods and systems that are directed to solving at least some of the issues described above, and/or additional issues.

SUMMARY

In an embodiment, a mobile electronic device application causes a display of the device to present a social network user interface to the device's user. The user interface displays posts from other network members who are connected to the device's user in the social network. The application selects one of the displayed posts, highlights the selected post on the display, and determines that a gyroscope, accelerometer and/or other motion sensor of the mobile electronic device has detected that the device has been shaken while the selected post was highlighted. In response to detecting that the device has been shaken while the selected post was highlighted, the application causes an expression of the first user's positive reaction to the selected post to be displayed via the social network so that the first user's positive reaction can be viewed by at least the member who provided the selected post to the social network.

In some embodiments, highlighting the selected post may include displaying the selected post in a font having a different size, background or color than other posts displayed concurrently with the selected post. Alternatively or in addition, highlighting the selected post may include displaying a bar along a side of the display, such that a portion of the bar that corresponds to the post presents an appearance that it distinct from portions of the bar that do not correspond to the post. Alternatively or in addition, highlighting the selected post may include displaying an icon in an area that corresponds to the selected post.

In some embodiments, the application may determine whether the motion sensor senses that the first user has shaken the device within a threshold period of time after detecting the first shake. If so, it may cause the social network to remove the expression of the first user's positive reaction.

In some embodiments, the application may wait a threshold period of time before causing the expression of the first user's positive reaction to the selected post to be displayed on the social network. If so, it may only cause the expression to be displayed on the social network if the motion sensor does not detect an additional shake within the threshold period of time.

In some embodiments, the application may detect that the first user has shaken the device by receiving a signal from the motion sensor. In such embodiments, it may require that the device confirm that the signal exhibits a magnitude or duration that exceeds a predetermined threshold before it sends the transmission to the social network.

In some embodiments, the social networking interface may include an input by which the first user may disable an ability of the device to cause an expression of the first user's positive reaction to the selected post to be displayed on the social network in response to detecting that the first user has shaken the device.

In an alternate embodiment, a method of implementing a user interface for a social network via mobile electronic device includes outputting, via a display of the mobile electronic device to a first user, a social network user interface. The user interface displays posts from additional users who are connected to the first user in the social network, This embodiment includes providing, to the first user via the social network user interface, an input by which the first user may enable and disable an motion-sensitive interaction function; highlighting a selected post on the display; by a motion sensor of the mobile electronic device, outputting a signal indicating that the first user has shaken the device while the selected post was highlighted; determining that the signal exhibits a magnitude or duration that exceeds a predetermined threshold; displaying, to the first user via the social network user interface and not to any other user, an expression of the first user's positive reaction to the selected post; confirming that a counter-command is not received within a threshold period of time after the detecting or displaying; and causing, in response to the detecting, determining and confirming, an expression of the first user's positive reaction to the selected post to be displayed via the social network so that the first user's positive reaction can be viewed by at least the user who provided the selected post to the social network.

DETAILED DESCRIPTION

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

In this document, a "mobile electronic device" refers to a portable computing device that includes a processor, a display, a communications connection to a data network, and a non-transitory computer-readable memory. The memory may contain programming instructions in the form of a software application that, when executed by the processor, causes the device to perform one or more operations according to the programming instructions. Examples of mobile electronic devices include smartphones, personal digital assistants, tablet devices, electronic readers, laptop computers, media players, satellite navigation devices and the like.

Figure 1:
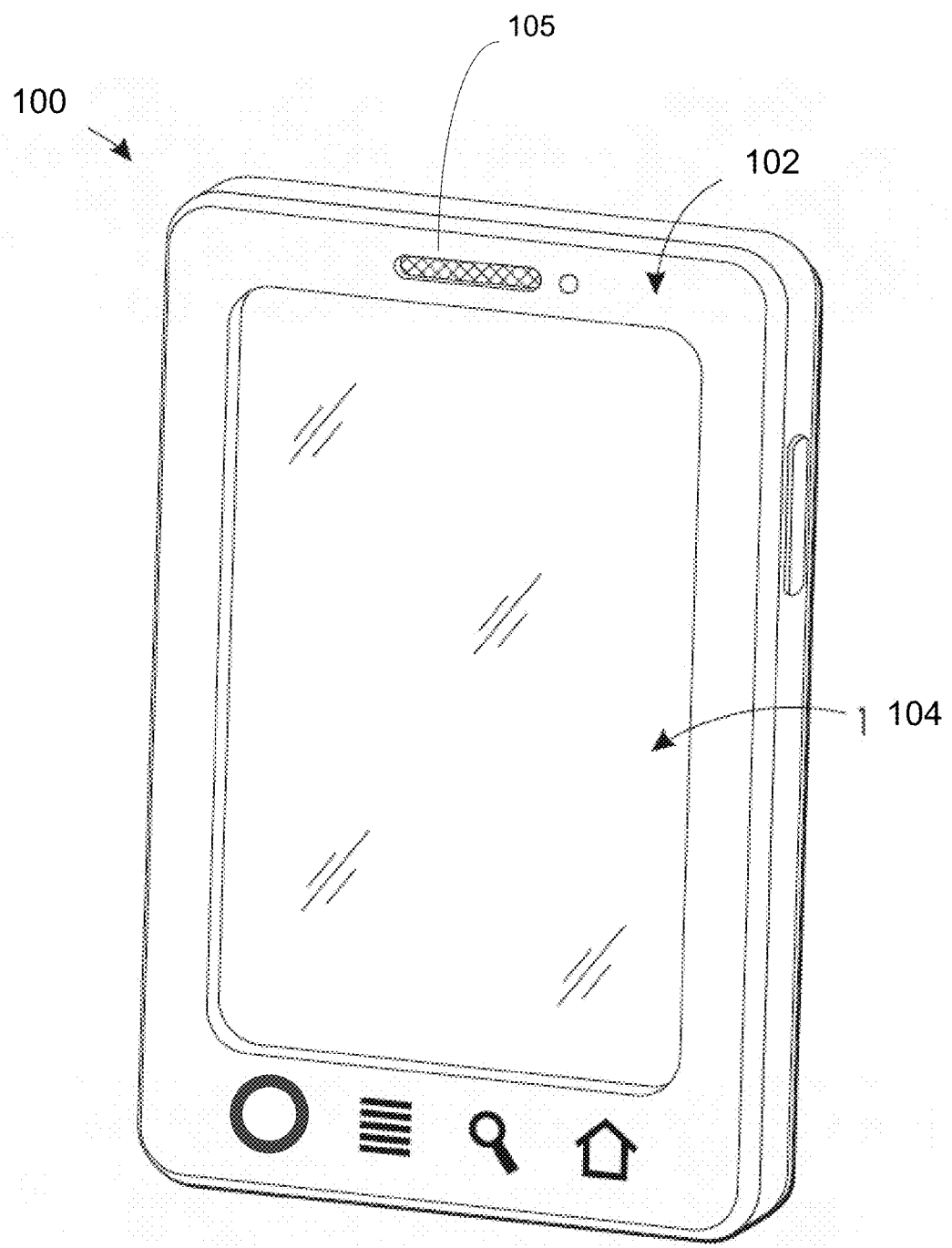
FIG. 1 illustrates an example of a mobile electronic device.

FIG. 1 shows one example of a mobile electronic device, generally designated 100. The mobile electronic device 100 may include a front face 102 and a display 104. The display 104 may be any suitable component for displaying images, including, but not limited to, an electroluminescent display, an electronic paper display, a vacuum fluorescent display, a light emitting diode (LED) display, a cathode ray tube (CRT) display, a liquid crystal (LCD) display, a plasma display panel, a digital light processing (DLP) display, and an organic light-emitting diode (OLED) display. The display 104 may further include a touch sensitive screen, including, but not limited to, a resistive touchscreen, capacitive touchscreen, and an infrared touchscreen. Thus, the display 104 is one type of user interface that the device may include. The device may include other types of user interfaces such as an audio output 105 such as a speaker or audio port.

Figure 2:
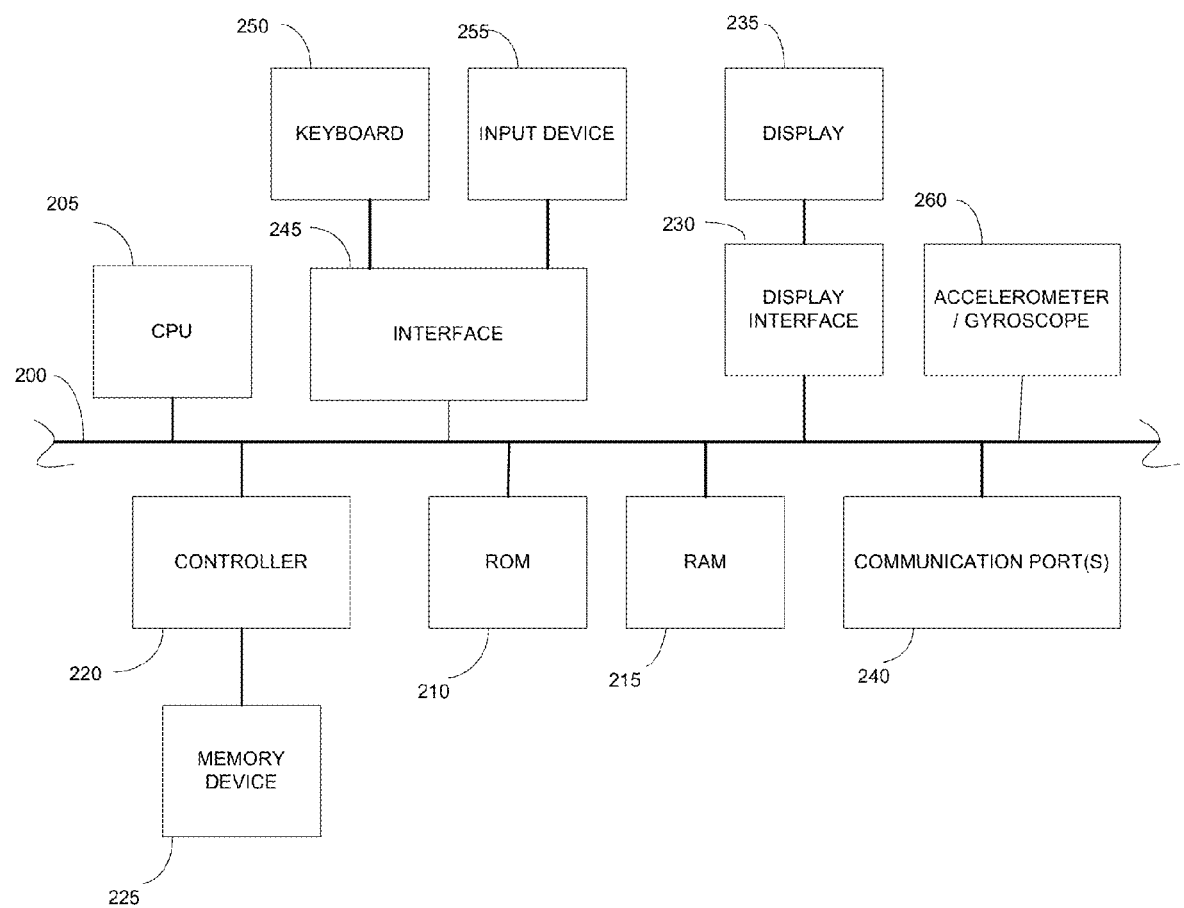
FIG. 2 is a block diagram that illustrates various components of a mobile electronic device.

FIG. 2 depicts an example of internal hardware of a mobile electronic device. For example, mobile electronic device 100 as discussed above may include a similar internal hardware architecture to that as illustrated in FIG. 2. An electrical bus 200 serves an information highway interconnecting the other illustrated components of the hardware. CPU 205 is a central processing unit of the system, performing calculations and logic operations required to execute a program. CPU 205, alone or in conjunction with one or more of the other elements disclosed in FIG. 2, is a processing device, computing device or processor as such terms are used within this disclosure. Read only memory (ROM) 210 and random access memory (RAM) 215 constitute examples of memory devices.

A controller 220 interfaces with one or more optional memory devices 225 that serve as data storage facilities to the system bus 200. These memory devices 225 may include, for example, a hard drive, a memory card such as a flash memory card, or one or more external memory devices that exchange information with the mobile electronic device via a communication port 240.

Program instructions, software or interactive modules for performing any of the functional steps associated with the processes described above may be stored in any of the mobile electronic device's memory structures. Optionally, some of the program instructions may be stored on an external computer readable medium such as that available to a remote server that exchanges data with the mobile electronic device through a communications connection. In such a situation, a software application or browser on the device may execute some programming instructions, while the remote server executes other instructions.

A display interface 230 may permit information from the bus 200 to be displayed on a display 235 in audio, visual, graphic or alphanumeric format. Communication with external devices may occur using various communication ports 240. A communication port 240 may be communicatively connected to a communications network, such as the Internet, a local area network or a wireless telecommunications network.

The hardware may also include an interface 245 which allows the device to receive data from input devices such as a keypad 250 or any other input device 255 such as one or more touch-sensitive components of the display 235. The hardware also will include one or more motion sensing devices 260, such as an accelerometer and/or gyroscope.

As used in this document, a "social media application" includes any application or interface to a remote network where a user member can consume (i.e., access and view) content such as photos, videos, hyperlinks or text-based content such as status updates as shared by other user members with whom the consuming user member has a connection in the network. As used this context, a "connection" refers to a social networking relationship in which two users of a social network consent to share content with each other, or in which a consuming member agrees to receive content shared by a sharing member via a content feed. Examples of social network connections include accepted connection, friend or link requests on networks such as Facebook, Instagram, Pinterest or LinkedIn; followers on networks such as Twitter; page likes on networks such as Facebook; and similar social networking relationships.

Figure 3:
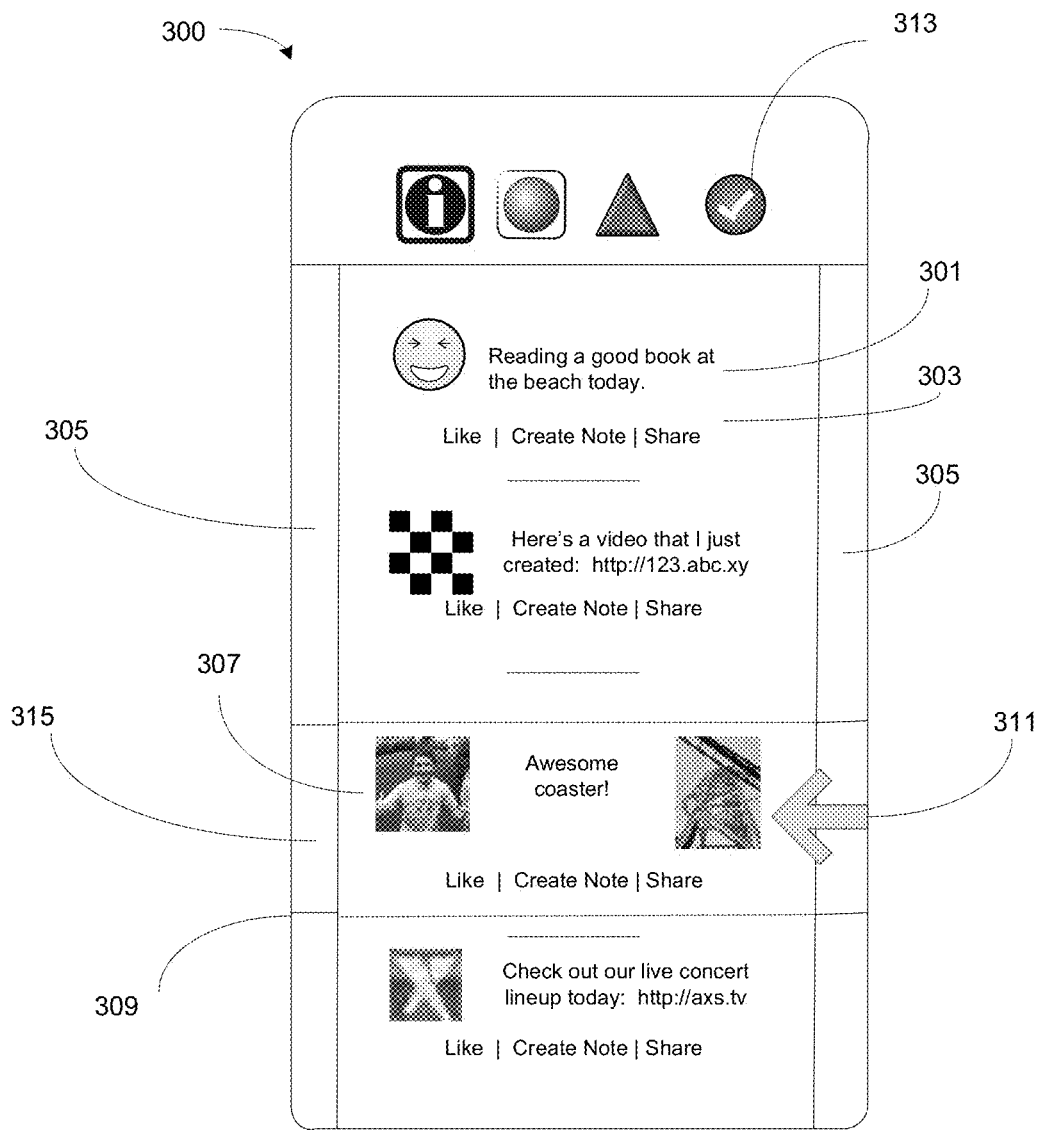
FIG. 3 illustrates an example of a social networking user interface.

FIG. 3 illustrates an example of a social network user interface 300 that provides a consuming member access to content that is shared by his or her connections. The interface, as implemented via a display of a mobile electronic device such as that shown in FIG. 1, displays multiple posts 301, 307, each of which provides content that one or more users have uploaded to the social network for consumption (i.e., access) via other users. Each post may include one or more interaction input functions 303. Such functions may include a positive reaction expressing function such as a "like," "favorite" or similar function. Other interaction input functions may include commands such as create a note or comment, share with others via a messaging system or other service, or other interaction functions. Optionally, the interface 300 may display evidence of the interaction inputs received for each post, such as a number of likes, the comments or a number of comments, and/or a number of shares.

In this embodiment, the social media application may cause the electronic device to display multiple posts and highlight one of the posts 307 to indicate which post may receive input interactions via a recognized motion that does not require touching the screen, a keyboard, or another touch-sensitive user input. Such a recognized motion, as described in more detail below, may be a shaking motion that is detected by a motion sensor of the mobile electronic device. The highlight may include, for example, one or more icons 311 such as arrows or other pointers adjacent to or near the highlighted post, one or more bars 309 or other dividing features that set off the highlighted post from other posts, or any other features that distinguish the highlighted post from other displayed posts, such as different colors, fonts, sizes of fonts or graphics, background shading, or other highlighting features.

Optionally, the user interface 300 may allow a user to move a post into the highlighted area of the display as the user scrolls through multiple posts on the interface. Alternatively, the user interface may include a function via which the user may select which post to highlight for a motion-sensitive input interaction. For example, the user interface may include one or more bars 305 along one or both sides of the user interface, and a slideable portion of the bar 315 may have an appearance (such as color or shading) that is distinguished from (i.e., different than) the remainder of the bar. The slideable portion 315 may be moveable up or down so that it can be moved to be adjacent to a post that the user desires to highlight for the motion-sensitive input interaction.

Optionally, the user interface also may include one or more inputs 313 such as buttons, voice inputs or other means by which the user of the device may enable and disable the motion-sensitive input interaction function of the social media application.

Figure 4:
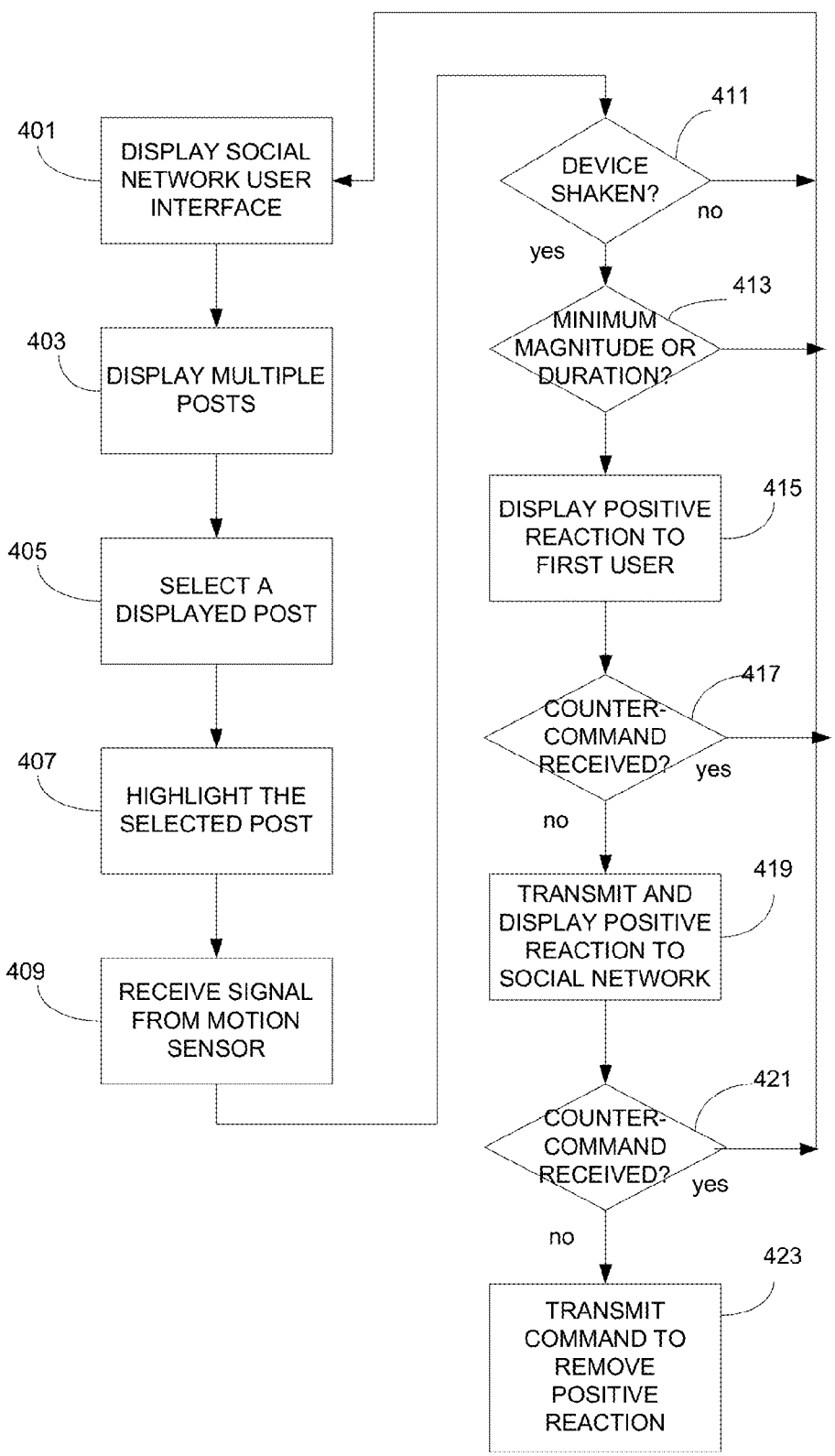
FIG. 4 is a flow diagram that illustrates various elements of a method in accordance with embodiments described below.

FIG. 4 is a flow diagram illustrating a method of implementing a user interface for a social network via portable electronic device such as that described above. In the method, an application on a mobile electronic device, a remote processor that is in communication with the mobile device, or a combination of the two may cause the device to output 401 a social network user interface to a first user via the device's display. The application receives, from the social network, multiple posts of content that were created by additional users who are connected to the first user in the social network, and it displays 403 at least a portion of those posts to the first user.

The application will select one of the displayed posts 405 and highlight the selected post on the display 407. The selection may be done automatically in accordance with one or more rules. For example, the selected post may be one that is positioned in a specified area on the display, such as the listed post, the last listed post or a post that is positioned within a designated area. Alternatively, the system may apply a rule that identifies the member who uploaded the post, determines whether the first user has interacted with the posting member at least a threshold number of times, and if so highlights that post. Other examples may include a method that identifies the members who posted each of the displayed posts and determines which of those members has interacted with the first user the most, or a method that identifies content of the displayed posts and determines which of the posts contains content of a type with which the first user has interacted the most. The highlighting may be done by any suitable method of distinguishing the highlighted post from the other concurrently displayed posts, such as a pointer, different color, different background, different size or other indicator such as those described in more detail above in the discussion of FIG. 3.

The electronic device's processor will receive one or more signals 409 from a motion sensor of the portable electronic device, such an accelerometer and/or gyroscope. If the signals provide the processor with information indicating that the device has been shaken while the selected post was highlighted 411, then in response the application may cause an expression of the first user's positive reaction to the highlighted post to be transmitted to the social network and displayed on the social network 419 in connection with the highlighted post so that the first user's positive reaction can be viewed by the user who provided the selected post to the social network, and optionally to other users who can view the post via the social network.

Optionally, to reduce the erroneous transmission of positive expressions, the system may implement one or more failsafe functions in the signal detection process. For example, the application may require that the signal indicating that the device has been shaken to exhibit at least a threshold magnitude and/or duration 413 before transmitting the expression of positive reaction to the social network. As another example, the system may wait a threshold period of time before transmitting the signal to the social network to determine whether the first user provides a counter-command 417 indicating the first user actually did not express the positive reaction. For example, the device may display the positive reaction only to the first user 415 via the first user's interface before the threshold time has passed so that the first user can provide a command to not deliver the positive reaction to the full network. A counter-command may be a second shaking action within the threshold period of time after detecting the shake, or within the threshold period of time after displaying the positive reaction to the first user.

In addition, after transmitting the positive reaction to the social network, the system may allow the first user to provide a command to remove the positive reaction from the social network at any time 421. For example, if the motion sensor senses that the first user has shaken the device within a threshold period of time after detecting the first shake, it may transmit a counter-command that causes the social network to remove the expression of the first user's positive reaction 423.

As an alternative to providing an expression of positive reaction to be transmitted to the social media network after detecting the shaking, the system may cause a different social media interaction to be shared with the social network in response to detecting the shaking. For example, in response to detecting a shake, the application may open a comment input field, and the first user may be given an opportunity to enter a comment to the other user's post by typing or speaking the comment. If so, then the application may close the comment field and transmit the comment to the social network after it detects that the comment is entered and the device has been shaken a second time. In some embodiments the system may store a library of recognized motions, such as up/down shake, side-to-side shake, rotate, vigorous shake, slow shake, or other motions, and the library may associate each recognized motion with a social media function such as express positive reaction, add comment, share with others via social media feed, or other functions. Thus, the features and functions described above may enable a social networking application to implement a "shake to like," "shake to comment, "shake to share" or similar function so that a user can like or otherwise interact with a post without having to touch a "like" button or implement a similar touch-based command.

The features and functions described above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method of implementing a user interface for a social network via a mobile electronic device, comprising, by one or more processors:
    causing a display of a mobile electronic device to present to a first user a social network user interface such that the user interface displays a plurality of posts from a plurality of additional users who are connected to the first user in the social network;
    selecting one of the displayed plurality of posts;
    highlighting the selected post on the display;
    based on an output of a motion sensor of the mobile electronic device, detecting that the first user has shaken the device while the selected post was highlighted;
    causing, in response to detecting that the first user has shaken the device while the selected post was highlighted, an expression of positive reaction of the first user to the selected post to be displayed via the social network so that the expression of positive reaction can be viewed by at least the user who provided the selected post to the social network; and
    determining whether the motion sensor senses that the first user has shaken the device again within a threshold period of time after detecting the first shake, and if so causing the social network to remove the expression of positive reaction.

2. The method of claim 1, wherein highlighting the selected post comprises displaying the selected post in a font having a different size, background or color than other posts displayed concurrently with the selected post.

3. The method of claim 1, wherein highlighting the selected post comprises causing the display to display a bar such that a portion of the bar that corresponds to the post presents an appearance that is distinct from portions of the bar that do not correspond to the post.

4. The method of claim 1, wherein highlighting the selected post comprises displaying an icon in an area that corresponds to the selected post.

5. The method of claim 1, wherein the motion sensor comprises a gyroscope or an accelerometer.

6. The method of claim 1, further comprising, by one or more of the processors, waiting a threshold period of time before causing the expression of positive reaction to the selected post to be displayed on the social network, and only causing the expression to be displayed on the social network if the motion sensor does not detect an additional shake within the threshold period of time.

7. The method of claim 1, wherein detecting that the first user has shaken the device comprises:
 receiving a signal from the motion sensor; and
 confirming that the signal exhibits a magnitude or duration that exceeds a predetermined threshold.

8. The method of claim 1 further comprising causing the display to provide to the first user an input by which the first user may disable an ability of the device to cause the expression of positive reaction to the selected post to be displayed on the social network in response to detecting that the first user has shaken the device.

9. A method of implementing a user interface for a social network via a mobile electronic device, comprising, by one or more processors:
 causing a display of a mobile electronic device to present to a first user a social network user interface such that the user interface displays a plurality of posts from a plurality of additional users who are connected to the first user in the social network;
 providing, to the first user via the social network user interface, an input by which the first user may enable and disable a motion-sensitive interaction function;
 highlighting a selected post on the display;
 detecting, by a motion sensor of the mobile electronic device, that the first user has shaken the device while the selected post was highlighted;
 outputting, by the motion sensor, a signal indicating that the first user has shaken the device while the selected post was highlighted;
 determining that the signal exhibits a magnitude or duration that exceeds a threshold;
 displaying, to the first user via the social network user interface and not to any other user, an expression of positive reaction of the first user to the selected post;
 confirming that a counter-command is not received within a threshold period of time after the detecting or displaying; and
 causing, in response to the detecting, determining and confirming, the expression of positive reaction to be displayed via the social network so that the expression of positive reaction can be viewed by at least the user who provided the selected post to the social network.

10. The method of claim 9, wherein highlighting the selected post comprises any of the following:
 displaying the selected post in a font having a different size, background or color than other posts displayed concurrently with the selected post;
 displaying a bar along a side of the display, such that a portion of the bar that corresponds to the post presents an appearance that is distinct from portions of the bar that do not correspond to the post; or
 displaying an icon in an area that corresponds to the selected post.

11. A social networking application for a mobile electronic device, comprising computer-readable instructions embodied in a non-transitory storage medium that, upon execution, cause a processor of a mobile electronic device to:
 output, via a display of the mobile electronic device to a first user, a social network user interface such that the user interface displays a plurality of posts from a plurality of additional users who are connected to the first user in the social network;
 select one of the displayed plurality of posts;
 highlight the selected post on the display;
 receive a signal from a motion sensor of the portable electronic device indicating that the first user has shaken the device while the selected post was highlighted;
 in response to receiving the signal indicating that the first user has shaken the device while the selected post was highlighted, cause an expression of positive reaction to the selected post to be displayed via the social network so that the expression of positive reaction can be viewed by at least the user who provided the selected post to the social network;
 determine whether the motion sensor sensed that the first user shook the device again within a threshold period of time after detecting that the first user shook the device while the selected post was highlighted; and
 if so, cause the device to send a communication to the social network to remove the expression of positive reaction from the social network.

12. The application of claim 11, wherein the instructions that cause the device to highlight the selected post comprise instructions to display the selected post in a font having a different size, background or color than other posts displayed concurrently with the selected post.

13. The application of claim 11, wherein the instructions that cause the device to highlight the selected post comprise instructions to display a bar on the display, such that a portion of the bar that corresponds to the post presents an appearance that is distinct from portions of the bar that do not correspond to the post.

14. The application of claim 11, wherein the instructions that cause the device to highlight the selected post comprise instructions to display an icon in an area that corresponds to the selected post.

15. The application of claim 11, further comprising additional instructions that cause the device to:
 determine whether the motion sensor sensed that the first user shook the device again within a threshold period of time after detecting that the first user shook the device while the selected post was highlighted; and
 if so, cause the device to send a communication to the social network to remove the expression of positive reaction from the social network.

16. The application of claim 11, further comprising additional instructions that cause the device to wait a threshold period of time before causing the expression of positive reaction to the selected post to be displayed on the social network, and that only cause the expression to be displayed on the social network if the motion sensor does not detect an additional shake within the threshold period of time.

17. The application of claim 11, wherein the instructions that cause the device to receive the signal further comprise instructions to confirm that the signal exhibits a magnitude or duration that exceeds a predetermined threshold.

18. The application of claim 11 further comprising instructions that, when executed, cause the device to output, via the display of the mobile electronic device, an input by which the first user may disable an ability of the device to cause the expression of positive reaction to the selected post to be displayed on the social network in response to detecting that the first user has shaken the device.

19. A method of implementing a user interface for a social network via a mobile electronic device, comprising:
by one or more processors:
causing a display of a mobile electronic device to present to a first user a social network user interface such that the user interface displays a plurality of posts from a plurality of additional users who are connected to the first user in the social network;
selecting one of the displayed plurality of posts;
highlighting the selected post on the display;
based on an output of a motion sensor of the mobile electronic device, detecting that the first user has shaken the device while the selected post was highlighted; and
causing, in response to detecting that the first user has shaken the device while the selected post was highlighted, an expression of positive reaction of the first user to the selected post to be displayed via the social network so that the expression of positive reaction can be viewed by at least the user who provided the selected post to the social network, but waiting a threshold period of time before causing the expression of positive reaction to the selected post to be displayed on the social network, and only causing the expression to be displayed on the social network if the motion sensor does not detect an additional shake within the threshold period of time.

20. A social networking application for a mobile electronic device, comprising computer-readable instructions embodied in a non-transitory storage medium that, upon execution, cause a processor of a mobile electronic device to:
output, via a display of the mobile electronic device to a first user, a social network user interface such that the user interface displays a plurality of posts from a plurality of additional users who are connected to the first user in the social network;
select one of the displayed plurality of posts;
highlight the selected post on the display;
receive a signal from a motion sensor of the portable electronic device indicating that the first user has shaken the device while the selected post was highlighted; and
in response to receiving the signal indicating that the first user has shaken the device while the selected post was highlighted, cause an expression of positive reaction to the selected post to be displayed via the social network so that the expression of positive reaction can be viewed by at least the user who provided the selected post to the social network, but wait a threshold period of time before causing the expression of positive reaction to the selected post to be displayed on the social network, and only cause the expression to be displayed on the social network if the motion sensor does not detect an additional shake within the threshold period of time.

* * * * *